United States Patent
Bigioi et al.

(10) Patent No.: US 9,118,833 B2
(45) Date of Patent: Aug. 25, 2015

(54) PORTRAIT IMAGE SYNTHESIS FROM MULTIPLE IMAGES CAPTURED ON A HANDHELD DEVICE

(75) Inventors: Petronel Bigioi, Galway (IE); Peter Corcoran, Claregalway (IE); Piotr Stec, Galway (IE)

(73) Assignee: FotoNation Limited, Ballybrit, Galway (IE)

( * ) Notice: Subject to any disclaimer, the term of this patent is extended or adjusted under 35 U.S.C. 154(b) by 768 days.

(21) Appl. No.: 13/306,568

(22) Filed: Nov. 29, 2011

(65) Prior Publication Data

US 2012/0133746 A1 May 31, 2012

Related U.S. Application Data

(60) Provisional application No. 61/417,737, filed on Nov. 29, 2010.

(51) Int. Cl.
*H04N 13/02* (2006.01)
*H04N 5/232* (2006.01)
*H04N 5/76* (2006.01)

(52) U.S. Cl.
CPC ....... *H04N 5/23293* (2013.01); *H04N 5/23219* (2013.01); *H04N 13/0221* (2013.01)

(58) Field of Classification Search
CPC .......... H04N 13/0055; H04N 13/0221; H04N 13/0296; H04N 13/0431; H04N 13/0003; H04N 13/0239; H04N 13/0497; H04N 13/0242
USPC ...................................... 348/50, 46
See application file for complete search history.

(56) References Cited

U.S. PATENT DOCUMENTS

| | | |
|---|---|---|
| 4,970,663 A | 11/1990 | Bedell et al. |
| 5,384,615 A | 1/1995 | Hsieh et al. |
| 5,982,951 A | 11/1999 | Katayama et al. |

(Continued)

FOREIGN PATENT DOCUMENTS

| | | |
|---|---|---|
| GB | 2 405 764 A | 3/2005 |
| JP | 2003274097 | 9/2003 |

(Continued)

OTHER PUBLICATIONS

PCT Notification of the Transmittal of the International Search Report and the Written Opinion of the International Search Authority, or the Declaration, for PCT Application No. PCT/EP2011/071233, report dated Mar. 2, 2012, 9 Pages.

(Continued)

*Primary Examiner* — Sath V Perungavoor
*Assistant Examiner* — Howard D Brown, Jr.
(74) *Attorney, Agent, or Firm* — Hickman Palermo Becker Bingham LLP

(57) ABSTRACT

A hand-held digital image capture device (digital camera) has a user-selectable mode in which upon engaging the mode the device detects a face in the field of view of the device and generates a face delimiter on a camera display screen, the delimiter surrounding the initial position of the image of a the face on the screen. The device is arranged to indicate thereafter to the user if the device departs from movement along a predetermined concave path P with the optical axis of the device pointing towards the face, such indication being made by movement of the image of the face relative to the delimiter. The camera captures and stores a plurality of images at successive positions along the concave path.

24 Claims, 4 Drawing Sheets

(56) References Cited

U.S. PATENT DOCUMENTS

| | | | |
|---|---|---|---|
| 6,094,215 | A | 7/2000 | Sundahl et al. |
| 7,110,569 | B2 | 9/2006 | Brodsky et al. |
| 7,424,218 | B2* | 9/2008 | Baudisch et al. ............. 396/322 |
| 8,279,265 | B2* | 10/2012 | Tseng et al. ..................... 348/36 |
| 8,520,131 | B2* | 8/2013 | Takeuchi et al. ............. 348/346 |
| 8,600,194 | B2* | 12/2013 | Doepke .......................... 382/294 |
| 8,687,041 | B2* | 4/2014 | Wakabayashi .................. 348/36 |
| 2003/0123751 | A1 | 7/2003 | Krishnamurthy et al. |
| 2003/0142209 | A1 | 7/2003 | Yamazaki et al. |
| 2004/0041914 | A1* | 3/2004 | Peters, III ................ 348/207.99 |
| 2004/0189849 | A1* | 9/2004 | Hofer ....................... 348/333.03 |
| 2005/0099494 | A1* | 5/2005 | Deng et al. ...................... 348/36 |
| 2007/0057815 | A1* | 3/2007 | Foy et al. ....................... 340/905 |
| 2007/0081081 | A1 | 4/2007 | Cheng ........................ 348/218.1 |
| 2007/0085913 | A1* | 4/2007 | Ketelaars et al. ............. 348/239 |
| 2008/0074489 | A1* | 3/2008 | Zhang et al. .................... 348/36 |
| 2009/0034086 | A1* | 2/2009 | Montgomery et al. ....... 359/629 |
| 2010/0188560 | A1 | 7/2010 | Sakai et al. |
| 2011/0141224 | A1 | 6/2011 | Stec et al. |
| 2011/0141225 | A1 | 6/2011 | Stec et al. |
| 2011/0141226 | A1 | 6/2011 | Stec et al. |
| 2011/0141227 | A1 | 6/2011 | Bigioi et al. |
| 2011/0141229 | A1 | 6/2011 | Stec et al. |
| 2011/0141300 | A1 | 6/2011 | Stec et al. |
| 2011/0234750 | A1* | 9/2011 | Lai et al. ......................... 348/37 |
| 2012/0019614 | A1* | 1/2012 | Murray et al. .................. 348/36 |
| 2012/0105682 | A1* | 5/2012 | Hata et al. ..................... 348/239 |
| 2012/0182400 | A1* | 7/2012 | Yamashita et al. ............. 348/50 |
| 2012/0300019 | A1* | 11/2012 | Yang et al. ...................... 348/36 |
| 2013/0046793 | A1* | 2/2013 | Reznik et al. ................. 707/797 |
| 2013/0155187 | A1* | 6/2013 | Skyberg ......................... 348/46 |
| 2013/0155205 | A1* | 6/2013 | Kosakai et al. ................. 348/50 |

FOREIGN PATENT DOCUMENTS

| | | |
|---|---|---|
| JP | 2006174318 | 6/2006 |
| JP | 2009-065577 | 3/2009 |
| WO | 2007/142621 A1 | 12/2007 |
| WO | 2011/069698 A1 | 6/2011 |

OTHER PUBLICATIONS

PCT Notification of Transmittal of the International Search Report and the Written Opinion of the International Searching Authority, or the Declaration, for PCT Application No. PCT/EP2010/064107, dated Dec. 29, 2010, 8 Pages.

Japan Patent Office, "Notification of Reason for Refusal" in application No. 2013-540414, dated Feb. 12, 2014, 11 pages.

Current Claims in application No. 2013-540414, dated Feb. 2014, 1 page.

* cited by examiner

PORTRAIT IMAGE SYNTHESIS FROM MULTIPLE IMAGES CAPTURED ON A HANDHELD DEVICE

PRIORITY AND RELATED APPLICATION

This patent application claims the benefit of priority to U.S. provisional patent application Ser. No. 61/417,737, filed Nov. 29, 2010. This application is related to a contemporaneously-filed PCT application, serial no. PCT/EP2011/071233. These applications are incorporated by reference.

BACKGROUND OF THE INVENTION

1. Field of the Invention

This invention relates to the synthesis of an enhanced portrait image from at least two images captured on a handheld digital image capture device

2. Description of the Related Art

A hand-held digital image capture device is provided that has a display screen and a user-selectable mode in which upon engaging the mode the device detects a face in the field of view of the device and generates a face delimiter on the screen surrounding the initial position of the image of the face on the screen. The device thereafter indicates to the user if the device departs from movement along a predetermined concave path with the optical axis of the device pointing towards the face, such indication being made by movement of the image of the face relative to the delimiter. The device captures and stores a plurality of images at successive positions along the path.

One or more non-transitory processor-readable storage media having code embodied therein is/are also provided for programming a processor to operate a camera-enabled device in any of the user-selectable modes described herein.

BRIEF DESCRIPTION OF THE DRAWINGS

Several further embodiments are provided, by way of example, with reference to the accompanying drawings, in which.

DETAILED DESCRIPTION OF THE EMBODIMENTS

Figure 1:
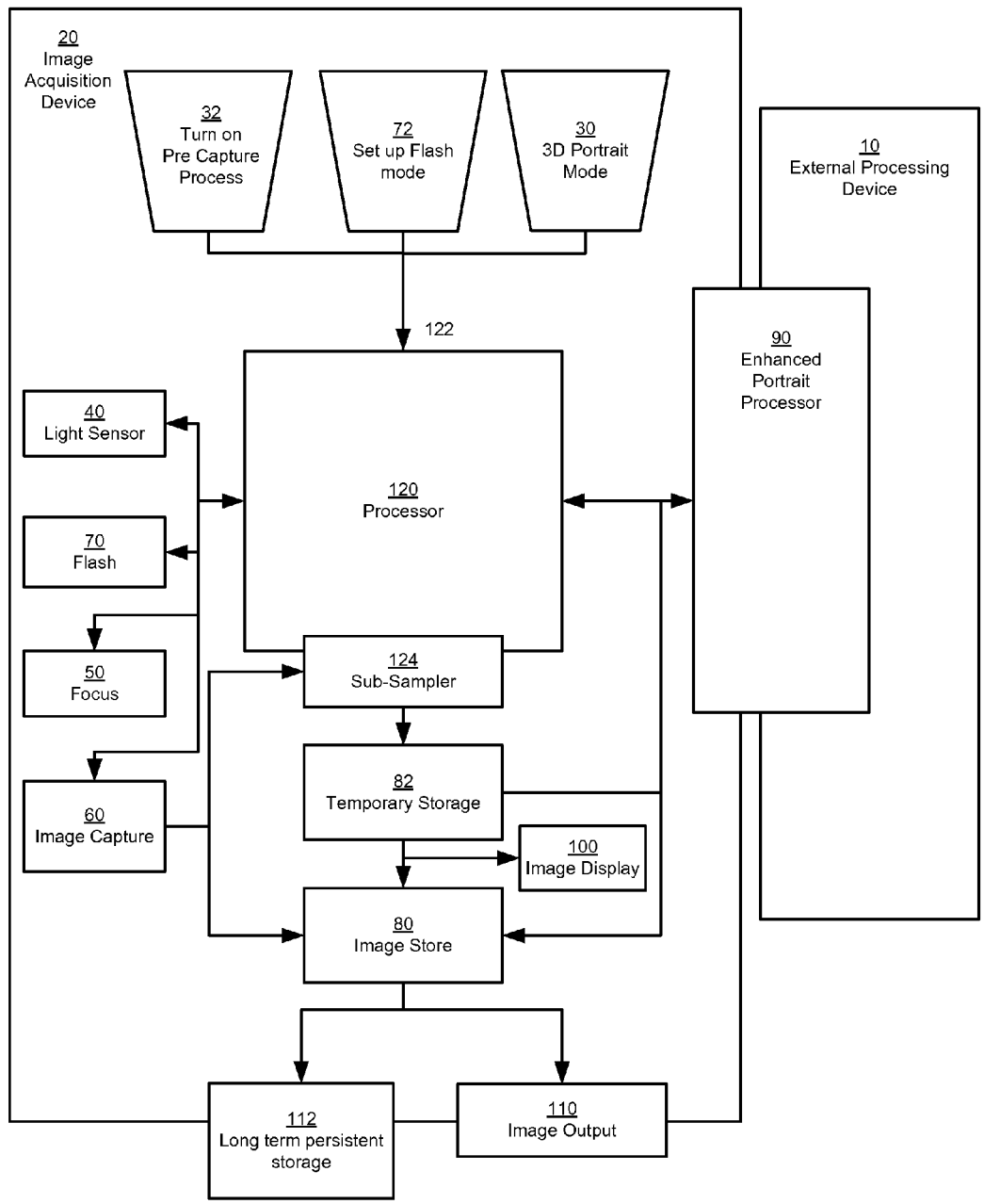
FIG. 1 is a block diagram of a digital camera in accordance with certain embodiments.

FIG. 1 is a block diagram of a hand-held digital image acquisition device 20. In the present embodiment the device 20 is a hand-held digital camera as such, but it could be the camera part of a cell phone or other hand-held device incorporating a digital camera function. All such devices are referred to herein as cameras for convenience whether or not that is their main function.

The camera 20 includes a digital processor 120. Many of the processes performed in or by the digital camera may be implemented in or controlled by software operating in the processor 120, including user interface functions and control of peripheral components such as buttons and display screen.

The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. If a flash is to be used, processor 120 causes the flash 70 to generate a photographic flash in substantial coincidence with the recording of a high resolution image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a digital display screen 100, such as an LCD, for preview and post-view of images. The display screen 100 may be an electronic viewfinder screen or it may be an external screen, usually placed on the rear of the camera body.

Before the main (high resolution) image is captured, successive preview images are generated in certain embodiments and displayed on the screen 100 to assist the user in composing the image, as well as being used to determine focusing and exposure in the pre-capture mode. Temporary storage 82 may be used to store one or more of the preview images and can be part of the image store 80 or a separate component. The preview images may be generated by the image capture component 60. For speed and memory efficiency reasons, preview images may have a lower pixel resolution than the main image taken when the shutter button is fully depressed, and may be generated by sub-sampling a raw captured image using software 124 which can be part of the general processor 120 or dedicated hardware or combination thereof.

When the user is satisfied with the preview image, the user can press the shutter button fully down to capture the high resolution main image.

In addition to the functions described above, the camera 20 has a user-selectable "enhanced portrait" mode. In this mode, when the shutter button is fully depressed the camera is caused to automatically capture and store a series of images while the user moves around a concave path centred on the face of one of the human subjects to be imaged. The captured images are then processed to synthesise an enhanced portrait image. The human subject to be imaged may also move the camera and capture the enhanced portrait image of her own face, without the assistance of another person.

Referring to FIGS. 2 to 6, an illustrative example of the use and operation of the camera 20 for generating an enhanced portrait image of a subject in accordance with certain embodiments is as follows:

1. The camera user 200 readies the camera for 3D portrait mode 30 by pushing a particular button on the camera body, rotating a dial to a particular position, or other triggering mechanism.

2. The camera user 200 positions himself at position A for a three quarter view of the head 202 of a person 204 to be photographed, as in FIG. 2. The optical axis 206 of the camera lens system is pointing directly towards, and the camera is auto focussed on, the subject's head 202, and specifically the subject's face 203.

In certain embodiments a shallow depth of field may be selected to throw the background out of focus. However this is optional and not normally needed as will be explained shortly.

3. When the user 200 is satisfied with the composition, as seen in the preview image, the shutter button is half-pressed. In response, the camera 20 uses standard face-detection techniques to detect the face 203 of the subject 204 in the preview image, and the camera then generates and displays a face delimiter 208 closely surrounding the image 210 of the detected face 203 on the display screen 100, as in FIG. 3. The face delimiter 208 is shown as a rectangular box in this example, but it may be another continuous or discontinuous (e.g. dashed) polygonal and/or curved shape. At this stage, the focus is locked.

4. Now the user 200 fully presses the shutter button and a visual or audible indication, such as a starting beep, is emitted by the camera. This indicates to the user that, while continuing to hold down the shutter button, he should now move the camera 20 around the subject 204 along a predetermined concave path P (FIG. 2) which in the present case has an approximately constant radius r centred on the subject's face 203, the user ensuring that the optical axis 206 of the camera continues to point directly towards the person's face.

Such motion along a concave path may not be a natural one for the user to follow. It may be challenging even for an experienced researcher to correctly sweep the handheld device through such a path. Therefore, such movement is assisted in the following manner using the face delimiter 208.

The size and position of the face delimiter 208, as initially established in step 3, is thereafter fixed on the display screen throughout the movement along the path P. This fixed face delimiter 208 assists the user in maintaining the camera 20 on the path P by allowing the user to attempt to maintain the face image 210 within and occupying the full width and height of the delimiter 208 at all times.

Figure 2:
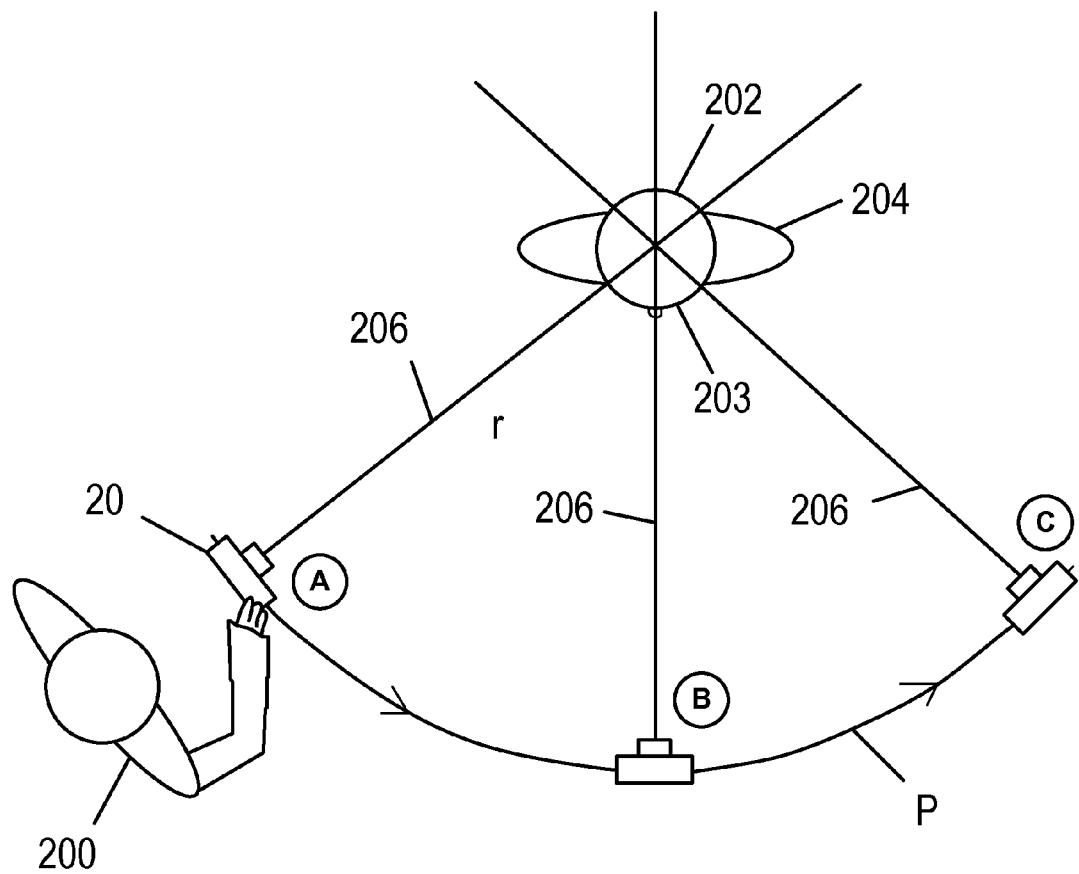
FIGS. 2 to 6 are schematic diagrams illustrating operations of the camera each in accordance with certain embodiments.

For example, FIGS. 4a, 4b and 4c show the face delimiter 208 and face image 210 when the camera 20 is correctly positioned at points A, B and C respectively on the path P, as in FIG. 2, with the optical axis pointing directly towards the face. In each case the face image 210 substantially fills the delimiter 208 and does not extend outside it.

Figure 5:
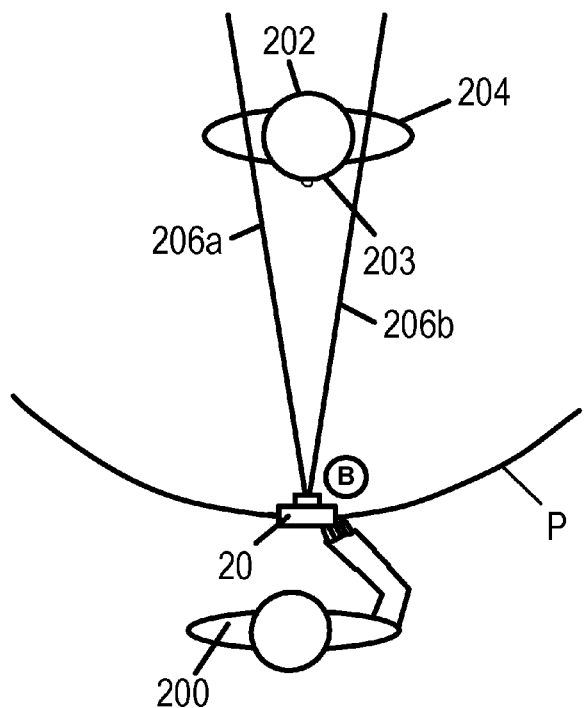
Figure 6:
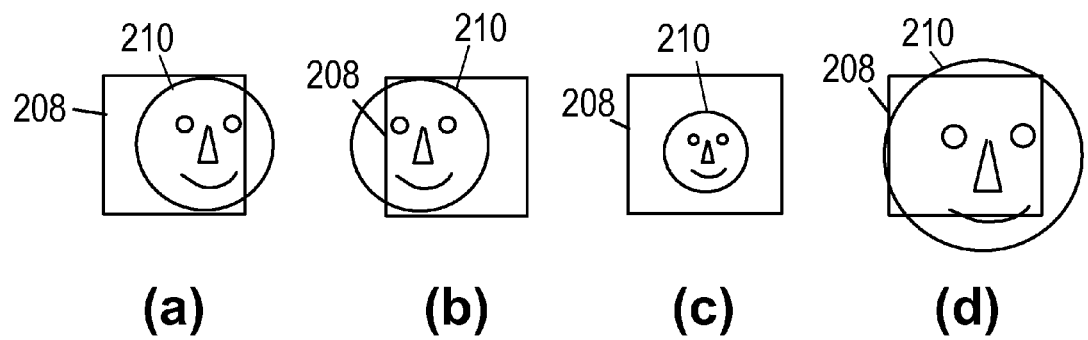

On the other hand, if the optical axis is off-centre, and points for example to the left or right of the face as shown at 206a and 206b in FIG. 5, the result on the image screen is shown in FIGS. 6(a) and 6(b) respectively. This would indicate to the user that she should rotate the camera slightly to re-centre the face image 210 in the delimiter 208.

FIGS. 6(c) and 6(d) show the results of the camera being respectively too far away from, and too near to, the subject 204. This would indicate to the user that he has to bring the camera nearer to or further from the subject 204 in order to properly fill and centre the face image 210 in the delimiter 208. Alternatively, the face image 208 could be maintained properly filling the delimiter 208 by automatically zooming the camera lens as appropriate, although this would not adequately compensate for gross deviations in distance due to the effects of perspective.

5. During the movement along the path P the camera warns the user 200, visually and/or audibly, if the face image 210 is getting too big or small relative to delimiter 208, indicating that the camera is moving towards or away from the subject's face, or if the face image is moving sideways off the delimiter, indicating that the optical axis 206 of the camera is not centered on the subject's face. In particular, as soon as the camera 20 begins to move so that the face image 210 moves outside the face delimiter 208 by more than a certain small amount, or the face image 210 grows or shrinks more than 5% from the initial size, the camera 20 is configured to provide a warning to the user. There may be one or two general warning sounds or other communications, or more specific warnings. The specific warnings may even include words such as "too far right," "too far left," "too low" and "too close," etc. In alternative embodiments graphical warning indicators may be used, or the boundary of the face delimiter 208 may flash intermittently on one or more sides or otherwise change to indicate the nature of the error.

6. During the movement along the path P the camera 20 captures and stores successive high resolution images of the subject 202, including background scenery. These images may be captured at predetermined angular positions along the path P, as determined by an inertial sensor in the camera or from the frame-to-frame displacement of successive images. Alternatively, they may be captured at predetermined time intervals, it being assumed that the movement along the path occurs approximately at some known rate. In the latter case a warning may also be provided if the user does not move the camera within an optimal range of speed, as determined based on the readings from the inertial sensor. Moving too quickly may not allow a sufficient number of "good" images to be captured, while moving too slowly can tend to make it difficult for the user to achieve a smooth and continuous sweep motion.

In the present example embodiment at least two images at an optimal stereoscopic displacement are used. The stereo displacement depends on the distance to the face (which can be determined with sufficient accuracy from the face size) and for most realistic generation of a 3D stereoscopic portrait it is ideally or approximately equal to the separation of the eyes in a person. However it may be desirable to capture at a greater separation to emphasize the 3D portrait. It is also generally desirable to capture a plurality of stereoscopic pairs in case the subject is blinking, twitching, moving, blurred, being partially occluded or otherwise providing an unsatisfactory face in one image of a pair and not in the other.

7. The concave portrait sweep along the path P may be terminated manually by the user or automatically by the camera 20 once a sufficient number of (good) stereoscopic image pairs have been acquired, or the facial region has moved too far outside the acceptable sweep path. A suitable indication, either by means of audible tone, or message on the camera screen informs the user if the sweep was successful or provides a suitable error message.

Where the sweep is terminated by the user, the user 200 releases the shutter button when the camera reaches position C, as in FIG. 2, having a three quarter view of the head 202 from the opposite side to the position A, or earlier if an indication of a successful sweep is given. The shutter release ends the image capture function of the enhanced portrait mode. In an alternative embodiment, instead of holding the shutter down during the entire sweep along the path P, the shutter could be briefly depressed at the start and briefly depressed again at the end to indicate the end of the sweep.

8. After step 7 the camera 20 selects at least one "good" stereo pair (i.e., images captured during periods when no warnings were made to user). In certain embodiments the user may be offered multiple pairs to select from.

It may also be desirable to capture at least one additional image associated with each image pair so that the background may be reconstructed with a differing degree of blur to the main stereo face pair. This may be desirable in particular if the portrait is a close-up. In such cases the stereo separation desired for the foreground face may introduce an excessive difference in perspective on the background of the portrait scene which may be uncomfortable for the viewer. Thus it may be desirable to use a background taken from an image frame captured between the left-hand and right-hand images of the main stereoscopic image pair. This additional image is referred to as an intermediate image as it lies between the left-hand and right-hand images of a stereo pair. In an example embodiment the left-hand image is retained, but the facial region from the right-hand image is separated from the background and composited over the facial region of the intermediate image.

In alternative embodiments where this third image is not available the background blur may be refined by separating the facial images and foreground region of each image in the stereo pair from the respective background. The two backgrounds may then be initially aligned and disparity and depth map calculations may be used to more selectively determine near and far background regions. Both background regions may then be selectively un-aligned or selectively blurred or both, based on the determined pixel disparities and or depth maps to provide a more convincing 3D Bokeh effect. The original facial images are then re-composited over their respective backgrounds to provide a more convincing 3D portrait. Where one or both of the modified backgrounds do not exactly match the original facial image and foreground region then matching portions of the other background image may be composited to fill in such voids.

In an alternative embodiment the device may simply capture an enhanced Bokeh effect 2D portrait, by performing the same process, creating depth map and choosing only one still image to use the depth map and blur the background, while keeping the foreground object.

In alternative embodiments multiple stereo pairs may be captured as the camera traces the concave path, enabling a pseudo-3D slideshow of the subject to be created. The pairs may be stored either in the form of multi-image still format or in a movie 3D format. In certain embodiments this slideshow may be subject to additional post-processing to generate a more sophisticate 3D model of the person, or to perform advanced pseuro-3D facial recognition In alternative embodiments a plurality of matching stereo pairs may be retained to allow a 3D portrait sweep slideshow to be prepared. This may involve additional post-processing, but if the cameras has a sufficiently powerful CPU it may be prepared and viewed in-camera.

In certain embodiments where the capture device has an auto-stereoscopic 3D display (e.g. Nintendo 3DS) the user perspective on the 3D sweep portrait may be varied by moving the imaging device, and detecting its motion using an internal sensor or otherwise. As the imaging device is moved the display cycles forward, or backward, through the multiple stereo pairs in the slideshow according to the motion of the device. Note that this may involve the user moving her head together with the device to maintain her position relative to the auto-stereoscopic display.

Post-processing of the stored images, as described above, may be performed in an enhanced portrait mode processor 90. The processor 90 can be integral to the camera 20 (for example, it could be the processor 120 with suitable programming) or part of an external processing device 10 such as a desktop computer. Where the processor 90 is integral to the camera 20, the final processed image may be displayed on the image display screen 100, saved on a persistent storage 112 which can be internal or a removable storage such as CF card, SD card or the like, or downloaded to another device via image output means 110. In embodiments where the processor 90 is implemented in an external device 10, the final processed image may be returned to the camera 20 for storage and display as described above, or stored and displayed externally of the camera.

Where the field of view of the camera 20 contains more than one face, the camera is initially pointed at, and during movement along the path P is maintained pointing at, the face of one of the subjects, e.g. using a face priority based mechanism, or the face may be selected by the user. That individual face will be used as point of reference to have minimum parallax in creating a consequent depth map. Additional faces may be detected and information from such additional detected faces (e.g. size, eye location and/or facial orientation) helps to improve the accuracy of the depth map.

More specifically as the camera moves through its controlled path the sizes of additional faces will increase/decrease and the location of eyes and other facial features provides information about changes in orientation of these additional faces. This information indicates the relative depth of such additional faces relative to the main subject and facilitates the separation of these faces from the scene background. In such multi-face embodiments more than two images may be captured to facilitate the creation of a final optimized stereoscopic image. In particular stereo image pairs, optimized for each additional face may be acquired in addition to the stereo image pair for the main face. These will be acquired based on the relative depth of each additional face relative to the main face.

Figure 3:
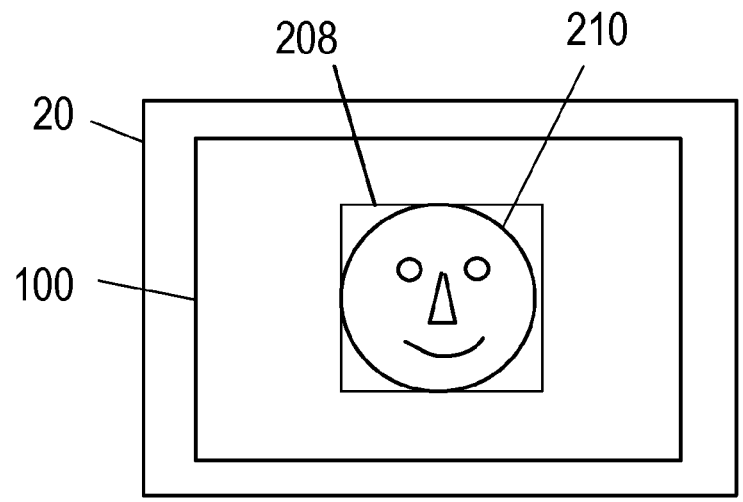
Figure 4:
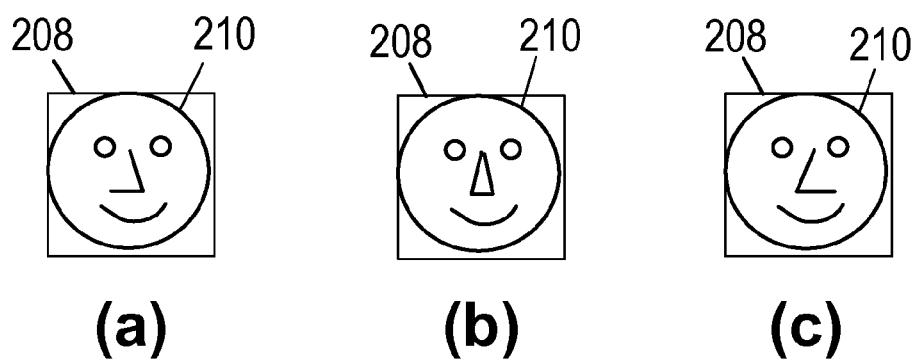

Although the foregoing embodiment has the camera moving along a predetermined concave path of constant radius centered on the subject's face, as in FIG. 2, the centre of rotation of the concave path is not necessarily at the subject's face. In fact the path may be modified according to the distance of the camera from the face. When the face is more distant from the camera, then a shorter radius of curvature than the actual distance to the face may be used as this exaggerates the disparity between the stereo pair (which is reduced at greater distances). When the face is in close-up, then a longer radius of curvature may be used to reduce the disparity (which is increased) and obtain a more optimal stereo pair. A longer radius of curvature may also be used for the sweep when there are multiple faces to optimize the acquisition of suitable stereo pairs for each face. In such embodiments the user is not aware of the radius of curvature, but is directed to sweep at the correct radius using the position of the face 210 within the face delimiter 208 as shown in FIG. 3, the size of the delimiter being dynamically adjusted by the camera according to the desired path which the user is expected to take based upon the initial position of the user relative to the face.

Certain embodiments provide a camera or camera-enabled device that is configured to easily and accurately separate foreground and background regions of a scene, determine a detailed and accurate depth map of the scene and optionally capture at least one stereoscopic image pair of the foreground object(s) of the scene. Embodiments further provide a camera or camera-enabled device that is configured to selectively blur the background regions according to their relative depths and recomposit them with the extracted foreground regions, or alternatively, with a stereoscopic pair of the foreground, to create an enhanced portrait image.

INCORPORATION BY REFERENCE

What follows is a cite list of references which are, in addition to those references cited above and below herein, and including that which is described as background, the invention summary, brief description of the drawings, the drawings and the abstract, hereby incorporated by reference into the detailed description of the embodiments, as disclosing alternative embodiments of elements or features of the embodiments not otherwise set forth in detail herein. A single one or a combination of two or more of these references may be consulted to obtain a variation of one or more of the described embodiments. Further patent, patent application and non-patent references are cited in the written description and are also incorporated by reference into the detailed description of the embodiments with the same effect as just described with respect to the following references:

U.S. Pat. Nos. 7,362,368, 7,616,233, 7,315,630, 7,269,292, 7,471,846, 7,574,016, 7,440,593, 7,317,815, 7,551,755, 7,558,408, 7,587,068, 7,555,148, 7,564,994, 7,565,030, 7,715,597, 7,606,417, 7,692,696, 7,680,342, 7,792,335, 7,551,754, 7,315,631, 7,469,071, 7,403,643, 7,460,695, 7,630,527, 7,469,055, 7,460,694, 7,515,740, 7,466,866, 7,693,311, 7,702,136, 7,620,218, 7,634,109, 7,684,630, 7,796,816, 7,796,822, 7,844,135, 7,853,043, 7,864,990, 7,868,922, 7,912,245, 7,912,285, 7,916,897, 7,916,971, 7,953,287, 7,957,597, 7,965,875, 7,995,795, 7,995,855, 8,005,265, 8,005,268, 8,009,208, 8,036,458, 8,036,460, 8,050,465, 8,050,466, 8,055,029, 8,055,067 and 8,055,090 and U.S. published patent applications Nos.: US 2006-0204034, US 2007-0201725, US 2007-0110305, US 2009-0273685, US 2008-0175481, US 2007-0160307, US 2008-0292193, US 2007-0269108, US 2008-0013798, US 2008-0013799, US 2009-0080713, US 2009-0196466, US 2008-0143854, US 2008-0220750, US 2008-0219517, US 2008-0205712, US 2009-0185753, US 2008-0266419, US 2009-0263022, US 2009-0244296, US 2009-0003708, US 2008-0316328, US 2008-0267461, US 2010-0054549, US 2010-0054533, US 2009-0179998, US 2009-0052750, US 2009-0052749, US 2009-0087042, US 2009-0040342, US 2009-0002514, US 2009-0003661, US 2009-0208056, US 2009-0190803, US 2009-0245693, US 2009-0303342, US 2009-0238419, US 2009-0238410, US 2010-0014721, US 2010-0066822, US 2010-0039525, US 2010-0165150, US 2010-0060727, US 2010-0141787, US 2010-0141786, US 2010-0220899, US 2010-0092039, US 2010-0188530, US 2010-0188525, US 2010-0182458, US 2010-0165140, US 2010-0202707, US 2011-0216158, US 2011-0243439, US 2011-0279700, US 2011-0205381, US 2011-0157408, US 2011-0102553, US 2011-0058060, US 2011-0002506, US 2011-0141227, US 2011-0141226, US 2011-0141225, US 2011-0141229, US 2011-0141300, US 2011-0141224; and PCT published applications nos. WO 2011/069698 A1, and PCT application no. PCT/IB2011/002715; PCT/EP2011/071233, which are all incorporated by reference.

While exemplary drawings and specific embodiments have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as set forth in the claims below and structural and functional equivalents thereof. The invention is not limited to embodiments described above either expressly or as incorporated by reference, and other embodiments and features within the scope of the invention may be understood by those skilled in the art.

What is claimed is:

1. A hand-held digital image capture device, comprising:
   a lens and an image sensor for capturing digital images;
   a display unit configured to display the digital images on a display screen;
   a digital processor, operatively coupled to the image sensors and the display unit, the digital processor being configured to:
      detect a particular object in a field of view in front of a user of the image capture device;
      capture a first image comprising a representation of the particular object;
      detect whether the image capture device is repositioned along a predetermined concave path;
      wherein the predetermined concave path is with respect to an optical axis of the image capture device pointing toward the particular object;
      wherein the predetermined concave path is around the particular object;
      wherein the predetermined concave path has an approximately constant radius centered at the particular object;
      automatically capture a second image of the particular object only upon detecting that the image capture device is repositioned along the predetermined concave path with respect to the optical axis of the image capture device pointing toward the particular object; and
      store the first image and the second image in a storage device.

2. A device as claimed in claim 1, wherein the device is arranged to alert the user when the device deviates from the path by greater than a predetermined amount.

3. A device as claimed in claim 1, wherein the device is arranged to alert the user when a size of a face image deviates by more than a predetermined amount from an initial size.

4. A device as claimed in claim 1,
   wherein the digital processor is further configured to generate an object delimiter that delimitates the representation of the particular object in the first image on the display screen;
   wherein the display unit is further configured to display the object delimiter on the display screen;
   wherein the digital processor is further configured to alert the user when a face image moves out of the delimiter by more than a predetermined amount.

5. A device as claimed in claim 4, wherein when a single face is detected by the device the object delimiter is fixed in size and position on the display screen during movement along the concave path.

6. A device as claimed in claim 4, wherein the corresponding object delimiter dynamically changes in size on the display screen as the device moves along the concave path.

7. A device as claimed in claim 1, wherein the digital processor is further configured to alert the user if a speed of movement along the path falls outside predetermined limits.

8. A device as claimed in claim 1, wherein the stored images comprise at least one stereo pair.

9. One or more non-transitory processor-readable storage media having code embodied therein for programming a processor to operate a camera-enabled device in a user-selectable mode to detect a face in a field of view of the device, the code causing the processor to perform:
   detecting a particular object in a field of view in front of a user of a image capture device;
   capturing a first image comprising a representation of the particular object;
   detecting whether the camera-enabled device is repositioned along a predetermined concave path with respect to an optical axis of the camera-enabled device pointing toward the particular object;
   wherein the predetermined concave path is with respect to an optical axis of the image capture device pointing toward the particular object;
   wherein the predetermined concave path is around the particular object;
   wherein the predetermined concave path has an approximately constant radius centered at the particular object;

automatically capture a second image of the particular object only upon detecting that the image capture device is repositioned along the predetermined concave path with respect to the optical axis of the image capture device pointing toward the particular object; and storing the first image and the second image in a storage device.

10. The one or more non-transitory processor-readable storage media as claimed in claim 9, wherein the code further causes the processor to perform:

alerting the user when the device deviates from the path by greater than a predetermined amount.

11. The one or more non-transitory processor-readable storage media as claimed in claim 9, wherein the code further causes the processor to perform:

generating an object delimiter that delimitates the representation of the particular object in the first image on a display screen;

displaying the object delimiter on the display screen; and alerting the user when a size of a face image deviates by more than a predetermined amount from an initial size.

12. The one or more non-transitory processor-readable storage media as claimed in claim 11, wherein the code further causes the processor to perform:
alert the user when a face image moves out of the delimiter by more than a predetermined amount.

13. The one or more non-transitory processor-readable storage media as claimed in claim 11, wherein when a single face is detected by the device the object delimiter is fixed in size and position on the display screen during movement along the concave path.

14. The one or more non-transitory processor-readable storage media as claimed in claim 11, wherein the corresponding object delimiter dynamically changes in size on the display screen as the device moves along the concave path.

15. The one or more non-transitory processor-readable storage media as claimed in claim 11, wherein the code further causes the processor to perform:

alert the user if a speed of movement along the path falls outside predetermined limits.

16. The one or more non-transitory processor-readable storage media as claimed in claim 9, wherein the stored images comprise at least one stereo pair.

17. A method of synthesizing a portrait image from multiple images, comprising:

detecting a particular object in a field of view in front of a user of an image capture device;

capturing a first image comprising a representation of the particular object;

detecting whether the image capture device is repositioned along a predetermined concave path with respect to an optical axis of the image capture device pointing toward the particular object;

wherein the predetermined concave path is with respect to an optical axis of the image capture device pointing toward the particular object;

wherein the predetermined concave path is around the particular object;

wherein the predetermined concave path has an approximately constant radius centered at the particular object;

automatically capture a second image of the particular object only upon detecting that the image capture device is repositioned along the predetermined concave path with respect to the optical axis of the image capture device pointing toward the particular object; and storing the first image and the second image in a storage device.

18. The method of claim 17, further comprising indicating when the device deviates from the path by greater than a predetermined amount.

19. The method of claim 17, further comprising indicating when a size of the particular object deviates by more than a predetermined amount from an initial size.

20. The method of claim 17, further comprising:

generating an object delimiter that delimitates the representation of the particular object in the first image on a display screen;

displaying the object delimiter on the display screen; and indicating when a face image moves out of the delimiter by more than a predetermined amount.

21. The method of claim 20, wherein when a single face is detected by the device the object delimiter is fixed in size and position on the display screen during movement along the concave path.

22. The method of claim 20, further comprising dynamically changing the object delimiter in size on the display screen as the device moves along the concave path.

23. The method of claim 17, further comprising indicating when a speed of movement along the path falls outside predetermined limits.

24. The method of claim 17, wherein the stored images comprise at least one stereo pair.

* * * * *